US006622476B2

(12) United States Patent
Surnilla et al.

(10) Patent No.: US 6,622,476 B2
(45) Date of Patent: Sep. 23, 2003

(54) LEAN NO$_X$ STORAGE ESTIMATION BASED ON OXYGEN CONCENTRATION CORRECTED FOR WATER GAS SHIFT REACTION

(75) Inventors: Gopichandra Surnilla, West Bloomfield, MI (US); Grant Alan Ingram, West Lafayette, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/016,942

(22) Filed: Dec. 14, 2001

(65) Prior Publication Data

US 2002/0108367 A1 Aug. 15, 2002

Related U.S. Application Data

(63) Continuation-in-part of application No. 09/783,351, filed on Feb. 14, 2001.

(51) Int. Cl.[7] ............................................. F01N 3/00
(52) U.S. Cl. ................................... 60/276; 60/301
(58) Field of Search ..................... 60/274, 295, 301, 60/276

(56) References Cited

U.S. PATENT DOCUMENTS

| 3,886,260 A | * | 5/1975 | Unland ..................... 60/274 |
| 4,707,984 A | | 11/1987 | Katsuno et al. .............. 60/274 |
| 5,115,639 A | | 5/1992 | Gopp ........................ 60/274 |
| 5,282,360 A | | 2/1994 | Hamburg et al. ............. 60/274 |
| 5,343,701 A | | 9/1994 | Douta et al. ................. 60/276 |
| 5,473,887 A | | 12/1995 | Takeshima et al. |
| 5,528,899 A | | 6/1996 | Ono ......................... 60/276 |
| 5,537,816 A | | 7/1996 | Ridgway et al. ............. 60/274 |
| 5,579,637 A | | 12/1996 | Yamashita et al. ........... 60/276 |
| 5,610,321 A | | 3/1997 | Shinmoto ................. 73/23.32 |
| 5,619,852 A | | 4/1997 | Uchikawa .................. 60/276 |
| 5,655,363 A | | 8/1997 | Ito et al. ................... 60/276 |
| 5,771,685 A | | 6/1998 | Hepburn |
| 5,877,413 A | | 3/1999 | Hamburg et al. .......... 73/118.1 |
| 5,894,725 A | | 4/1999 | Cullen et al. |
| 5,983,629 A | | 11/1999 | Sawada ..................... 60/276 |
| 6,145,305 A | * | 11/2000 | Itou et al. ................... 60/277 |
| 6,220,017 B1 | * | 4/2001 | Tayama et al. .............. 60/276 |
| 6,345,498 B2 | * | 2/2002 | Yonekura et al. ............ 60/276 |
| 6,477,832 B1 | * | 11/2002 | Surnilla et al. ............. 60/285 |

FOREIGN PATENT DOCUMENTS

JP          09-126012          5/1997

* cited by examiner

Primary Examiner—Thomas Denion
Assistant Examiner—Diem Tran
(74) Attorney, Agent, or Firm—Julia Voutyras; Allan J. Lippa

(57) ABSTRACT

A method for estimating the amount of NO$_x$ stored in a lean NO$_x$ trap. The method includes determining a change in the oxygen concentration between an exhaust air/fuel ratio entering the lean NO$_x$ trap and exiting the lean NO$_x$ trap to determine the amount of NO$_x$ absorbed in the trap and correcting such determination for water gas shift reaction effects in such change in oxygen concentration determination.

3 Claims, 1 Drawing Sheet

LEAN NOx STORAGE ESTIMATION BASED ON OXYGEN CONCENTRATION CORRECTED FOR WATER GAS SHIFT REACTION

RELATED APPLICATIONS

This patent application is a continuation in part of our co-pending application Ser. No. 09/783,351 filed Feb. 14, 2001, entitled "METHOD FOR CORRECTING AN EXHAUST GAS OXYGEN SENSOR", assigned to the same assignees as the present application, the benefit of the filing date of which is claimed in this application under 35 U.S.C. 120 as to common subject matter claimed in this application.

TECHNICAL FIELD

This invention relates to vehicle emissions control systems and more particularly to methods and apparatus for determining $NO_x$ storage in lean $NO_x$ traps (LNTs).

BACKGROUND

As is known in the art, conventional lean burn engine control systems include an air/fuel controller that delivers fuel to the engine intake proportional to measured air mass to maintain a desired air/fuel, lean of stoichiometric. The typical three-way catalytic converter provided in the engine exhaust passage does not convert the $NO_x$ produced while running lean and in order to reduce $NO_x$ emission to the atmosphere, it has been proposed to locate a $NO_x$ trap (LNT) downstream of the three-way catalyst.

A typical $NO_x$ trap utilizes alkali metal or alkaline earth materials in combination with platinum in order to store or occlude $NO_x$ under lean operating conditions. The mechanisms for $NO_x$ storage involves the oxidation of NO to $NO_2$ over the platinum followed by the subsequent formation of a nitrate complex with the alkaline metal or alkaline earth. Under stoichiometric operation or operation rich of stoichiometric, the nitrate complexes are thermodynamically unstable, and the stored $NO_x$ is released and catalytically reduced by the excess of CO, $H_2$, and hydrocarbons (HCs) in the exhaust.

Accordingly, in the prior art, the amount of $NO_x$ introduced to the trap since the last purge is estimated and when the trap is estimated to be full the engine is switched to a relatively rich air/fuel to purge the $NO_x$ trap. After a predetermined purge time interval, the engine is returned to lean operation. The prior art relies on engine speed to determine $NO_x$ accumulation, see for example U.S. Pat. No. 5,473,887. However, engine speed alone does not provide an accurate estimation of $NO_x$ accumulation since several other variables that affect $NO_x$ accumulation are different at the same engine speed depending on other engine operating condition, thereby causing wide swings in the rate of $NO_x$ accumulation. It is important to obtain as accurate an estimate of $NO_x$ accumulation as possible since underestimation will permit lean operation to continue after the trap is full and tailpipe $NO_x$ emission will result. On the other hand overestimation of the accumulated $NO_x$ will cause purging at a rich A/F at a higher frequency than required, reducing fuel economy.

Other methods have been described for maintaining catalyst efficiency of $NO_x$ traps and for monitoring the performance of $NO_x$ traps. See for example, U.S. Pat. No. 5,894,725 "Method and Apparatus for Maintaining Catalyst Efficiency of a $NO_x$ Trap" inventors Cullen et al. Issued Apr. 20, 1999 and U.S. Pat. No. 5,771,685. "Method for Monitoring the Performance of a $NO_x$ Trap", inventor Hepburn, issued Jun. 30, 1998, both assigned to the same assignee as the present invention, the entire subject matter of both such U.S. Patents being incorporated herein by reference.

More particularly, during lean operation, the $NO_x$ is absorbed in a Lean $NO_x$ Trap by the $NO_x$ storing element, for example—Barium (Ba) by the following chemical reaction:

$$BaO + NO + O_2 \rightarrow Ba(NO_3)_2$$

As can be seen from the equation above, the $NO_x$ is absorbed using oxygen in the exhaust as part of the chemical reaction. Since oxygen is getting used up for absorption, the change in the oxygen concentration between the exhaust air/fuel entering the LNT and exiting the LNT can be used to determine the amount of $NO_x$ absorbed in the LNT. The inventors have recognized, however, that there is a water gas shift reaction that occurs in the exhaust which converts CO to $H_2$ in the vehicle's exhaust system given by: $CO + H_2O \rightarrow H_2 + CO_2$. Thus, the oxygen is used in both the NO reaction and in the hydrogen reaction. Therefore, in order to obtain an accurate determination of the amount of $NO_x$ in the LNT, the measurement of the change in the oxygen concentration between the exhaust air/fuel entering the LNT and exiting the LNT must be corrected for the water gas shift reaction effects. Absent such correction, the water gas shift reaction causes the tailpipe air/fuel ratio to be richer (less leaner) than the true value, thereby over estimating the amount of NOx absorbed in the LNT.

Further, the inventors have recognized that the amount of hydrogen used in the water gas reaction is related to the mathematical difference between an air/fuel ratio upstream of the LNT and an air/fuel ratio measured downstream of the LNT.

SUMMARY

In accordance with the present invention, a method is provided for estimating the amount of $NO_x$ stored in a $NO_x$ trap. The method comprises determining a change in the oxygen concentration between an exhaust air/fuel ratio entering the $NO_x$ trap and exiting the $NO_x$ trap to determine the amount of NOx absorbed in the trap.

In one embodiment, the method includes correcting such determination for water gas shift reaction effects in such change in oxygen concentration determination.

With such method, the estimation of the amount of NOx stored in the trap is corrected by correcting for the effect of hydrogen and water gas shift reaction in the trap. During a $NO_x$ purge cycle, the engine is first run at a rich air/fuel ratio to purge $NO_x$ from the trap. Then the engine is subsequent placed in a lean air/fuel ratio mode; i.e., the engine is commanded to run at a predetermined lean air/fuel ratio, $A/F_c$ typically 1.4 times nominal stoichiometry. Over an initial transient period of time, T, after initiating of this lean air/fuel ratio mode, the tail pipe, or downstream, air/fuel ratio reaches a steady state condition $A/F_{ss}$. The integration of the measured downstream air/fuel ration over the period of time T represents the integrated amount of oxygen concentration difference between oxygen entering and exiting the trap. This includes the amount of oxygen used in reacting with the $NO_x$ and the amount of oxygen reacting with the hydrogen in the water gas shift reaction. However, once the trap filled with NOx, the tail pipe, downstream air/fuel ratio reaches a steady state difference of Δ. This is due to water gas shift reaction caused by hydrogen in the trap. The error, i.e., $\Delta = A/F_c - A/F_{ss}$ times the period of time T is $A2 = \Delta * T$. Thus, the correct amount of oxygen used to react with the $NO_x$ and thus representing the amount of $NO_x$ absorbed by the trap is represented $A = A1 - A2$. Thus, this invention improves the methodology to give an accurate estimation of the $NO_x$ absorbed in the trap.

In accordance with a feature of the invention, a method is provided determining the amount of hydrogen used in a water gas reaction in a device, such as a $NO_x$ trap or a catalytic converter, disposed in the exhaust of an engine. The method includes determining a mathematical difference between an air/fuel ratio upstream of the device and an air/fuel ratio measured downstream of the device.

In accordance with the invention, a method is provided for determining the amount of hydrogen used in a water gas reaction in a reaction device disposed in an exhaust of an engine comprising determining a mathematical difference between an air/fuel ratio upstream of the device and an air/fuel ratio measured downstream of the device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
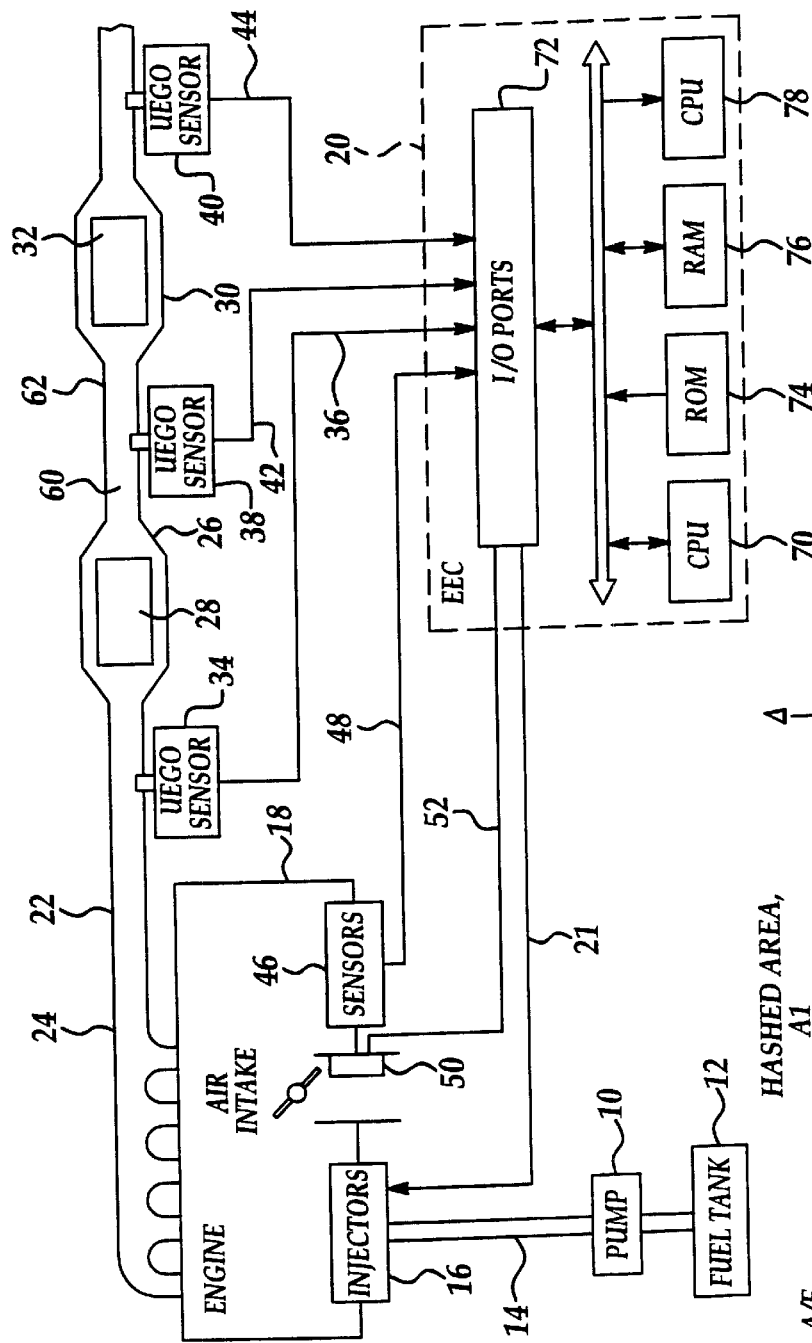
FIG. 1 is a block diagram of an engine control system according to the invention.

Referring now to the drawings, and initially to FIG. 1, a fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20. The EEC 20 transmits a fuel injector signal to the injectors 16 via signal line 21 to maintain an air/fuel determined by the EEC 20. The fuel tank 12 contains liquid fuels, such as gasoline, methanol or a combination of fuel types. An exhaust system 22, comprising one or more exhaust pipes and an exhaust flange 24, transports exhaust gas produced from combustion of an air/fuel mixture in the engine to a conventional three-way catalytic converter 26. The converter 26, contains a catalyst material 28 that chemically alters exhaust gas that is produced by the engine to generate a catalyzed exhaust gas.

The catalyzed exhaust gas is fed to a downstream $NO_x$ trap (LNT) 32 composed of material of the type previously described. The trap 32 is contained in a housing generally indicated at 30. A universal exhaust gas oxygen (UEGO) sensor 34 is disposed in the exhaust gas generated by the engine 18 and transmits a signal over conductor 36 to the EEC 20. A pair of UEGO sensor 38 and 40 is located upstream and downstream respectively of the trap 32, and provides signals to the EEC 20 over conductors 42 and 44, respectively. It should be understood that the universal exhaust gas oxygen (UEGO) sensor produces an output signal which provides the actual measured air/fuel ratio.

Still other sensors, indicated generally at 46, provide additional information about engine performance to the EEC 20, via bus 36 such as crankshaft position, angular velocity, throttle position, air temperature, etc. The information from these sensors is used by the EEC 20 to control engine operation.

A mass air flow sensor 50 positioned at the air intake of engine 18 detects the amount of air inducted into an induction system of the engine and supplies an air flow signal over conductor 52 to the EEC 20. The air flow signal is utilized by EEC 20 to calculate an air mass (AM) value which is indicative of a mass of air flowing into the induction system in lbs./min.

The EEC 20 comprises a microcomputer including a central processor unit (CPU) 70, input and output (I/O) ports 72, read only memory (ROM) 74 for storing control programs, random access memory (RAM) 76, for temporary data storage which may also be used for counters or timers, and keep-alive memory (KAM) 78 for storing learned values. Data is communicated over a conventional data bus as shown. The EEC 20 also includes an engine off timer that provides a record of the elapsed time since the engine was last turned off as a variable "soak time".

The liquid fuel delivery routine is executed by controller 20 for controlling engine 18. A calculation of desired liquid fuel is made. More specifically, the measurement of inducted mass air flow (MAF) from sensor 50 is divided by a desired air/fuel ratio (AFd) which in this example, is correlated with stoichiometric combustion. A determination is made whether closed loop feedback control is desired, by monitoring engine operating parameters such as engine coolant temperature. Fuel command or desired fuel signal Fd is generated by dividing feedback variable FV, into the previously generated open loop calculation of desired fuel in block 106. Desired fuel signal Fd is then converted to a pulse width signal fpw at block 108 for actuating fuel injector 16, thereby delivering fuel to engine 18 in relation to the magnitude of the desired fuel signal Fd.

Engine 18 is controlled by the EEC 20 in response to feedback signals from pre-catalyst proportional exhaust gas oxygen (UEGO) sensor 34 and post-catalyst proportional exhaust gas oxygen (UEGO) sensor 38 (signals EGO and UEGO, respectively). UEGO sensors 34 and 38 are proportional UEGO sensors, such as conventional universal exhaust gas oxygen (UEGO) sensors, that provide output signals indicative of the actual detected air/fuel ratio. Generally, the air/fuel control system attempts to maintain the air/fuel ratio in the engine 18 within the conversion window of catalytic converter 28 based on the feedback signals from pre-catalyst sensor 34 and post-catalyst sensor 38.

Our above-referenced co-pending patent application described correcting for the water gas shift reaction that occurs in the catalytic converter 28. More particularly, as described therein, the water gas shift reaction, which converts CO to $H_2$ in the vehicle's exhaust system, is given by:

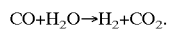

$$CO + H_2O \rightarrow H_2 + CO_2.$$

Thus, the vehicle exhaust gas has a lower concentration of CO and a higher concentration of $H_2$ downstream of the catalytic converter 28 than upstream. Because the output of conventional proportional UEGO sensor is sensitive to a different degree to the concentration of CO and $H_2$ in the exhaust gas, the output of the post-catalyst UEGO sensor 38 is affected by the water gas shift reaction that occurs in the catalytic converter 28. As a result, the output of post-catalyst UEGO sensor 38 (signal UEGO) tends to indicate a less lean air/fuel ratio during lean operation of the engine 18 and a less rich air/fuel ratio during rich operation relative to the air/fuel ratio upstream of the catalyst 28.

To correct for the systematic error resulting from the water gas shift reaction, our co-pending patent application describes adjusting the output of the post-catalyst sensor output by adding a correction bias to it. According to a first preferred method described in such patent application, a correction bias is estimated based upon the mathematical difference between respective average pre-catalyst and post-catalyst air/fuel ratios measured during a period of lean engine operation. Then, the calculated correction bias is used to adjust the post-catalyst sensor output during a subsequent period of lean operation. A similar method can be used to determine a correction bias during periods of rich engine operation. According to a second preferred method of the invention described in our co-pending patent application, a correction bias function is pre-determined and pre-programmed to provide a correction bias based upon a non-corrected post-catalyst air/fuel ratio measurement.

Here, in this patent application we extend our invention to estimating the amount of $NO_x$ stored in the lean $NO_x$ trap 32. As will be described in more detail below, the method comprises determining a change in the oxygen concentration between an exhaust air/fuel ratio entering the $NO_x$ trap 32 and exiting the $NO_x$ trap 32 to determine the amount of $NO_x$ absorbed in the trap 32.

Thus, our invention determines the amount of hydrogen used in a water gas reaction in a device, such as a $NO_x$ trap 32 or the catalytic converter 28, disposed in the exhaust of the engine 18. The method includes determining a mathematical difference between an air/fuel ratio upstream of the device and an air/fuel ratio measured downstream of the device.

Considering now the lean $NO_x$ trap 32. Vehicle operating conditions required in order to switch to a lean cruise mode of operation include such conditions as vehicle speed above a predetermined value or throttle position above a predetermined value. Whether the vehicle has been placed in a lean mode of operation is checked. In general, during the lean cruise mode, air/fuel operation proceeds open loop at a predetermined value such as 19 lb air/lb fuel for enhanced fuel economy. During lean cruise, $NO_x$ trapping material 32 will store nitrogen oxides passing through catalytic converter 28. When the maximum capacity of the trap material 32 is reached, the material 32 must be purged of stored nitrogen oxides by operating the engine at an air/fuel rich of stoichiometric. Lean cruise operation will continue, once established unless the material 32 exceeds a predetermined maximum capacity. Once this capacity is exceeded, the mode of operation switches from lean to rich and the $NO_x$ stored in the trap is converted to non-emission exhaust gas and released to the atmosphere.

Figure 2:
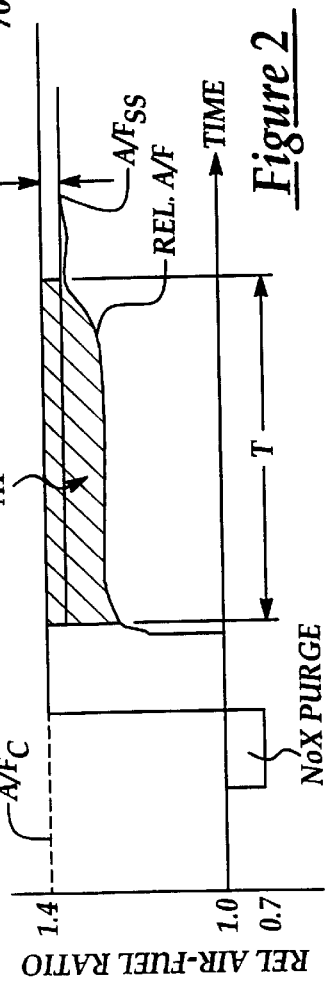

Here, the amount of $NO_x$ absorbed by the trap 32 is determined as follows: A determination is made of the change in the oxygen concentration between an exhaust air/fuel ratio entering the lean $NO_x$ trap 32 and exiting the lean $NO_x$ trap 32 to determine the amount of $NO_x$ absorbed in the trap 32. This determination is corrected for water gas shift reaction effects in such change in oxygen concentration determination. More particularly, the estimation of the amount of $NO_x$ stored in the trap 32 is correct by correcting for the effect of hydrogen and water gas shift reaction in the trap 32. During a $NO_x$ purge cycle, the engine 18 is first run at a rich air/fuel ratio to purge $NO_x$ from the trap 32, as shown in FIG. 2. Then the engine 18 is subsequent placed in a lean air/fuel ratio mode; i.e., the engine is commanded to run at a predetermined lean air/fuel ratio, $A/F_c$ typically 1.4 times nominal stoichiometry, as shown in FIG. 2. Over an initial transient period of time, T, after initiating of this lean air/fuel ratio mode, the tail pipe, or downstream, air/fuel ratio reaches a steady state condition $A/F_{ss}$, as shown in FIG. 2. The integration of the measured downstream air/fuel ration over the period of time T represents the integrated amount of oxygen concentration difference between oxygen entering and exiting the trap 32, here shown by the hashed area in FIG. 2 and designed as A1. This includes the amount of oxygen used in reacting with the $NO_x$ and the amount of oxygen reacting with the hydrogen in the water gas shift reaction. Thus, the hashed area A1 represents the integrated amount of oxygen concentration difference between oxygen entering and exiting the LNT. Therefore, the area A1 includes the area A2. However, once the trap 32 filled with $NO_x$, the tail pipe, downstream air/fuel ratio reaches a steady state difference of $\Delta$, as shown in FIG. 2. This is due to water gas shift reaction caused by hydrogen in the trap 32. The error, i.e., $\Delta = A/F_c - A/F_{ss}$ times the period of time T is $A2 = \Delta * T$. Thus, the correct amount of oxygen used to react with the $NO_x$ and thus representing the amount of $NO_x$ absorbed by the trap 32 is represented $A = A1 - A2$. This information is used by the EEC 20 to determine when to initiate the subsequent purge cycle. Thus, this invention improves the methodology to give an accurate estimation of the NOx absorbed in the trap 32.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining the amount of hydrogen used in a water gas reaction in
   a reaction device disposed in an exhaust of an engine comprising:
   operating the engine in a lean air/fuel ratio mode; and
   determining a mathematical difference between an air/fuel ratio upstream of the device and an air/fuel ratio measured downstream of the device with the engine operating in the lean air/fuel ratio mode.

2. The method recited in claim 1 wherein the reaction device is a lean $NO_x$ trap.

3. The method recited in claim 1 wherein the reaction device is a catalytic converter.

* * * * *